(12) United States Patent
Toda et al.

(10) Patent No.: US 6,246,661 B1
(45) Date of Patent: Jun. 12, 2001

(54) OPTICAL DISK RECORDING AND RETRIEVING DEVICE

(75) Inventors: Tsuyoshi Toda, Kodaira; Shigeki Yamazaki, Minamiashigara; Toshimitsu Kaku, Sagamihara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/644,748

(22) Filed: Aug. 24, 2000

Related U.S. Application Data

(60) Continuation of application No. 09/411,639, filed on Oct. 4, 1999, now Pat. No. 6,125,093, which is a division of application No. 08/870,405, filed on Jun. 6, 1997, now Pat. No. 5,974,021.

(30) Foreign Application Priority Data

Jun. 10, 1996 (JP) .................................................... 8-147013

(51) Int. Cl.$^7$ ........................................................ G11B 7/00
(52) U.S. Cl. ........................ 369/116; 369/47.5; 369/47.53
(58) Field of Search ..................... 369/116, 47.5, 369/47.51, 47.52, 47.53, 47.54, 47.55, 53.26, 53.27

(56) References Cited

U.S. PATENT DOCUMENTS

| | | |
|---|---|---|
| 5,513,165 * | 4/1996 | Ide et al. ............................. 369/116 |
| 5,513,166 | 4/1996 | Tokumitsu et al. . |
| 5,526,329 | 6/1996 | Bish et al. . |
| 5,537,381 | 7/1996 | Fuji . |
| 5,544,137 | 8/1996 | Ohara et al. . |
| 5,590,111 | 12/1996 | Kirino et al. . |
| 5,629,913 | 5/1997 | Kaku et al. . |
| 5,648,952 | 7/1997 | Maegawa et al. . |
| 5,687,156 | 11/1997 | Hurst, Jr. . |
| 5,737,289 | 4/1998 | Udagawa . |
| 5,777,964 | 7/1998 | Furata et al. . |
| 5,790,505 | 8/1998 | Ade et al. . |
| 5,793,737 | 8/1998 | Den Boef . |
| 5,808,972 | 9/1998 | Matsumoto et al. . |
| 5,862,103 | 1/1999 | Matsumoto et al. . |
| 5,898,655 | 4/1999 | Takahashi . |
| 5,905,695 | 5/1999 | Kimura . |
| 5,956,295 | 9/1999 | Yamakawa et al. . |
| 5,956,313 | 9/1999 | Maegawa et al. . |

FOREIGN PATENT DOCUMENTS 7-73468   3/1995   (JP) .

* cited by examiner

*Primary Examiner*—Nabil Hindi
(74) *Attorney, Agent, or Firm*—Mattingly, Stanger & Malur, P.C.

(57) ABSTRACT

The device seeks to improve the reliability of information and to increase recording capacity by controlling the recording mark to be recorded on the recording medium with high preciseness. To improve the conformity of a recording medium with a device that records, retrieves and erases information, a recording pulse train is generated by a test write data generating circuit 18 and a recording pulse forming circuit 15 and a recording mark is recorded on a recording medium 5 by a laser driver 14. Excessive power recording is reduced, an optimum recording power is determined and regular information recording and retrieving is carried out by detecting a test write data from a test write data detecting circuit 12 to which the retrieved signal from the recording medium 5 is input. Based upon analysis of the retrieved signal by a controller 19, and the range of next power scan is changed so as to avoid excessive power recording while making it possible to determine the optimum recording power.

4 Claims, 9 Drawing Sheets

RECORDING MARK

RECORDING POWER-Pn=Pb+KnΔPa+KnΔPw1+KnΔPw2
n=1~13(REFERENCE): RANGE OF POWER SCANNING
Kn: MAGNIFICATION FACTOR AT VARIABLE POWER

OPTICAL DISK RECORDING AND RETRIEVING DEVICE

This is a continuation application of U.S. Ser. No. 09/411,639, filed Oct. 4, 1999 now U.S. Pat. No. 6,125,093, which is a divisional application of U.S. Ser. No. 08/870,405, filed Jun. 6, 1997 now U.S. Pat. No. 5,974,021.

FIELD OF THE INVENTION

The present invention is related to an information recording and retrieval device that records and retrieves information to and from a recording medium. More precisely, the present invention relates to a recording and retrieving device that is capable of very precisely setting the optimum recording power used in thermal recording.

BACKGROUND OF THE INVENTION

A conventional method of setting the optimum recording power is disclosed in an unexamined patent publication JP 7-73468, published Mar. 17, 1995. This publication discloses a control method for minimizing the difference between a peak level obtained from the amplitude of a retrieved signal of an isolated mark pattern and a peak level obtained from the amplitude of a retrieved signal of a repeated mark pattern. Thus, this method, referred to as "test write record control" is realized by setting an optimum recording power by recording predetermined data on an optical disk and retrieving the recorded data.

SUMMARY OF THE INVENTION

The above-mentioned prior art method suffers problems that the present invention solves. For example, in the prior art, no consideration is paid to the differences in the recording and retrieving conditions of the magnetic media which have different recording sensitivities at similar recording densities and similar linear velocities. As a result, given the increase or decrease of recording power with the deviation of the recording sensitivity, the power scan range in the test write process does not function well. Also, the quality of the recording medium can be deteriorated by recording with excessive power depending upon the kind of recording medium being used.

As object of the present invention is to suppress the deviation of the recording mark as much as possible in order to form a highly precise recording mark and to improve the reliability of the information.

Another object of the present invention is to give proper consideration to the differences in the recording and retrieving conditions of the magnetic media which have different recording sensitivities at similar recording densities and similar linear velocities.

Yet another object of the present invention is to improve the reliability of the recording and retrieving device by suppressing changes in the characteristics of the recording medium, which can result from recording with too much power. This also extends the life of the light source.

Still another object of the present invention is to cope with the wide deviation of recording power due to the deviation of the recording sensitivity caused by the deviation of the thickness of the recording medium and the deviation of the environmental temperature.

In order to achieve the above-mentioned objects of the present invention, as well as other objects not specifically mentioned, the conformance of the recording, retrieving and erasing device to the recording medium is improved by judging the kind of the recording medium at the change of the recording medium and setting the recording and retrieving condition so that it conforms to that kind of recording medium. The deviation of the recording sensitivity of the recording medium by the deviation of the environmental temperature is suppressed by recording test write data with different levels of recording power at a predetermined position of the recording medium. The optimum recording power is determined based upon output signals that correspond to the different levels of recording power and is obtained from a retrieved signal of the recorded test write data. Then, recording and retrieval of regular information is carried out.

Furthermore, in the test write process over the power scan range is divided into the several processes. Thus, when deciding the optimum recording power based upon the data (V) obtained from the retrieved signal of the test write data of each power scan, the range of a subsequent power scan is set based upon the value (V). As a result, recording with excessive power during the test write process is prevented.

Additionally, in the test write process, the optimum recording power can always be found by recording the test write data starting at a low power in the range of recording power. This way, excessive power is not radiated to the recording medium and the output of the light source is kept to a minimum thereby extending the life of the light source.

Still further, the processing time for the test write process is reduced and transfer rate is improved by changing the output coefficient of the laser driver and carrying out the test write process by increasing or decreasing the output recording power for realizing the test write process under a wide deviation of the recording power for media of different recording sensitivities at similar recording densities and linear velocities, as well as accommodating environmental temperature deviations.

These and other objects, features and advantages of the present invention will become more apparent in view of the following detailed description of the present invention in conjunction with the Drawings.

DETAILED DESCRIPTION OF THE PREFERRED EMBODIMENT

Figure 1:
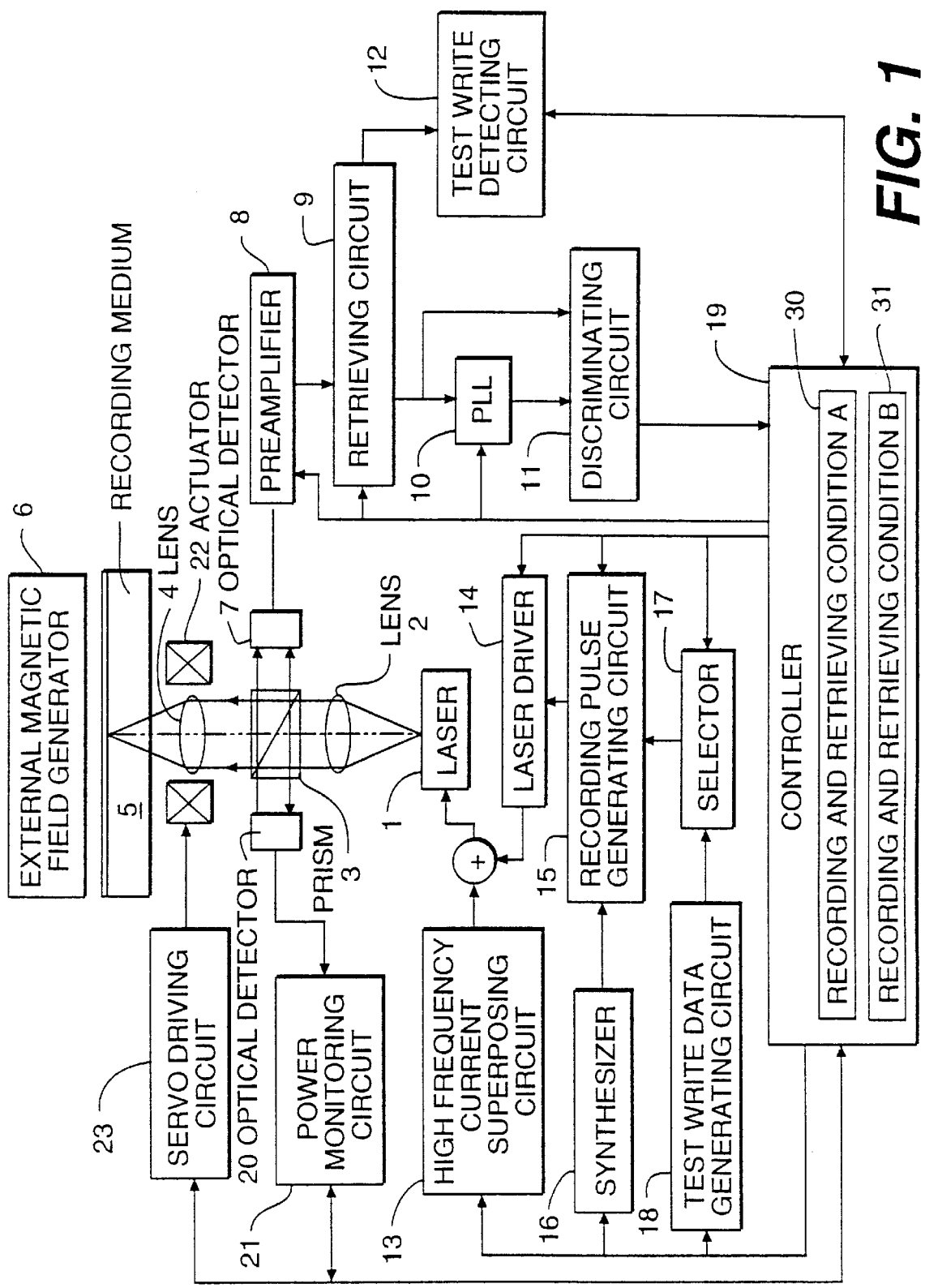
FIG. 1 is a block diagram illustrating a first embodiment of the present invention.

FIG. 1 illustrates a preferred embodiment of the configuration of a device according to the present invention. Some of the elements illustrated in FIG. 1 include a laser 1, lenses 2 and 4, a recording medium 5, optical detectors 7 and 20, a retrieving circuit 9, a test write data detecting circuit 12, a laser driver 14, a test write generating circuit 18, a controller 19, a recording and retrieving condition A 30, and a recording and retrieving condition B 31.

As shown in FIG. 1, a recording processing system including a recording pulse generating circuit 15 and a retrieving processing system, includes a retrieving circuit 9 that converts a retrieved signal obtained from an optical detector 7 into the desired information. The recording medium 5 includes a recording film and a substrate that supports it.

With respect to commands and information data from a host (not shown), the decoding of such commands and the modulation of data for recording are performed at controller 19 and then are converted to a code train that corresponds to the modulation method. A synthesizer 16 is an oscillator that generates a standard clock for the device. When the recording method called ZCAV (Zoned Constant Angular Velocity) is used, which is a method of getting a large storing capacity by changing standard clocks at each zone and getting similar recording density at the inner and outer circumference of the recording medium, the oscillating frequency of the synthesizer 16 is changed according to the zone.

The kind (or type) of recording medium is judged at the change of the recording medium and the recording and retrieving conditions 30 or 31 that conform to that kind of medium are set up. In this preferred embodiment, two conditions are described and corresponding to the above described kinds of medium and different recording medium (recording medium manufactured by each medium manufacturer) of the same kind, each condition is stored in a non-volatile memory of the controller 19. In response to the judgment of the kind of medium, the above described recording and retrieving condition is set up when required by the recording and retrieving device.

In a servo that controls the positioning of an optical spot to perform the recording and retrieving of the information, a focusing error signal and a tracking error signal are obtained with a cylindrical lens (not illustrated) arranged in front of an optical detector 7 (which is divided into four parts).

Before recording regular information, test write data is recorded on the recording medium to detect the deviation of the recording sensitivity, etc. due to the deviation of the film thickness of the recording medium upon change of the recording medium, the deviation of the environmental temperature and the change of characteristics of the recording device that records to the recording medium. As stated above, this is done to improve the conformity of the recording medium with the recording device.

The test write data is converted to the code train that corresponds to the modulation method and generated by the test write data generating circuit 18. It is possible that the test write data generating circuit 18 generates data other than that of the modulation method and the test write data detecting circuit 12 works in conjunction with such data. Therefore, the test write processing that corresponds to any recording density and recording method using any test write data can be carried out.

The code train that is modulated corresponding to the regular information data from the controller 19 and the code train from the test write data generating circuit 18 are input to the selector 17, and are switched by the control signal of the controller 19, corresponding to either the test write process or to the regular recording process. The code train from the selector 17 is input to the recording pulse generating circuit 15 and converted to the recording pulse train to control the length or the width of the recording mark.

This recording pulse train is input to the laser driver 14. The laser 1 is excited to a high power by the recording current from the laser driver 14. The light from the laser 1 is collected by the lens 2 into a parallel ray and goes through a prism 3. The light is focused on the recording medium 5 by the lens 4 to record a recording mark corresponding to the code train. The high frequency current superposing circuit 13 is provided for reducing the laser noise caused by the laser 1 and, considering the life of the laser, the high frequency current superposing circuit 13 is sometimes turned off during recording and erasing.

The laser 1 is excited to an oscillation of low power and the light is radiated to the recording medium 5. The optical path of the reflected light from the medium 5 is separated by the prism 3 and the light enters optical detector 7, preferably a photo detector. After the light is photo-electronically converted into a signal at the optical detector 7, it is amplified by the preamplifier 8 and input to the retrieving circuit 9. The retrieving circuit 9 includes a waveform equalizer, an automatic gain control circuit and a binary converting circuit, etc., and the input signal is converted to a binary signal.

The binary signal from the retrieving circuit 9 is input to a PLL (Phase Locked Loop) circuit 10 for self clocking. A retrieving clock signal that is synchronized with the binary signal obtained from the PLL 10 and the binary signal are input to a discriminator circuit 11 for the discrimination of the data. The discriminated data signal that is the output of the discriminator circuit 11 is input to the controller 19 and the data is demodulated.

An external magnetic field generator 6 is provided and is capable of switching the direction of the magnetic field when recording and erasing. The recording and erasing are performed with the radiation of the recording and erasing light energy. When receiving a data signal, a magneto-optical signal is obtained, by separating the reflected light to a p polarized light and an s polarized light by a wavelength plate (not illustrated) that is placed in front of photo detector 20. These signals are differentiated from each other by the photo detector 20 (which is divided to two parts).

During the test write process, the retrieved analog signal from the retrieving circuit 9 is transferred to the test write data detecting circuit 12. As is described in detail hereinafter, the recording pattern that is used for the test write process is the combination of the densest pattern of the highest frequency and the coarsest pattern of the lowest frequency of the device. The central level of the densest pattern and the central level of the coarsest pattern of the retrieved signal are detected by the test write data detecting circuit 12. The difference between the central levels is input to the A/D converter contained in the controller 19. The recording power, when the difference is almost zero, is judged to be an optimum recording power and regular recording is performed. Thus, with the test write process, the optimum recording power is set up continually and the recording of a highly precise record mark is enabled.

Figure 2:
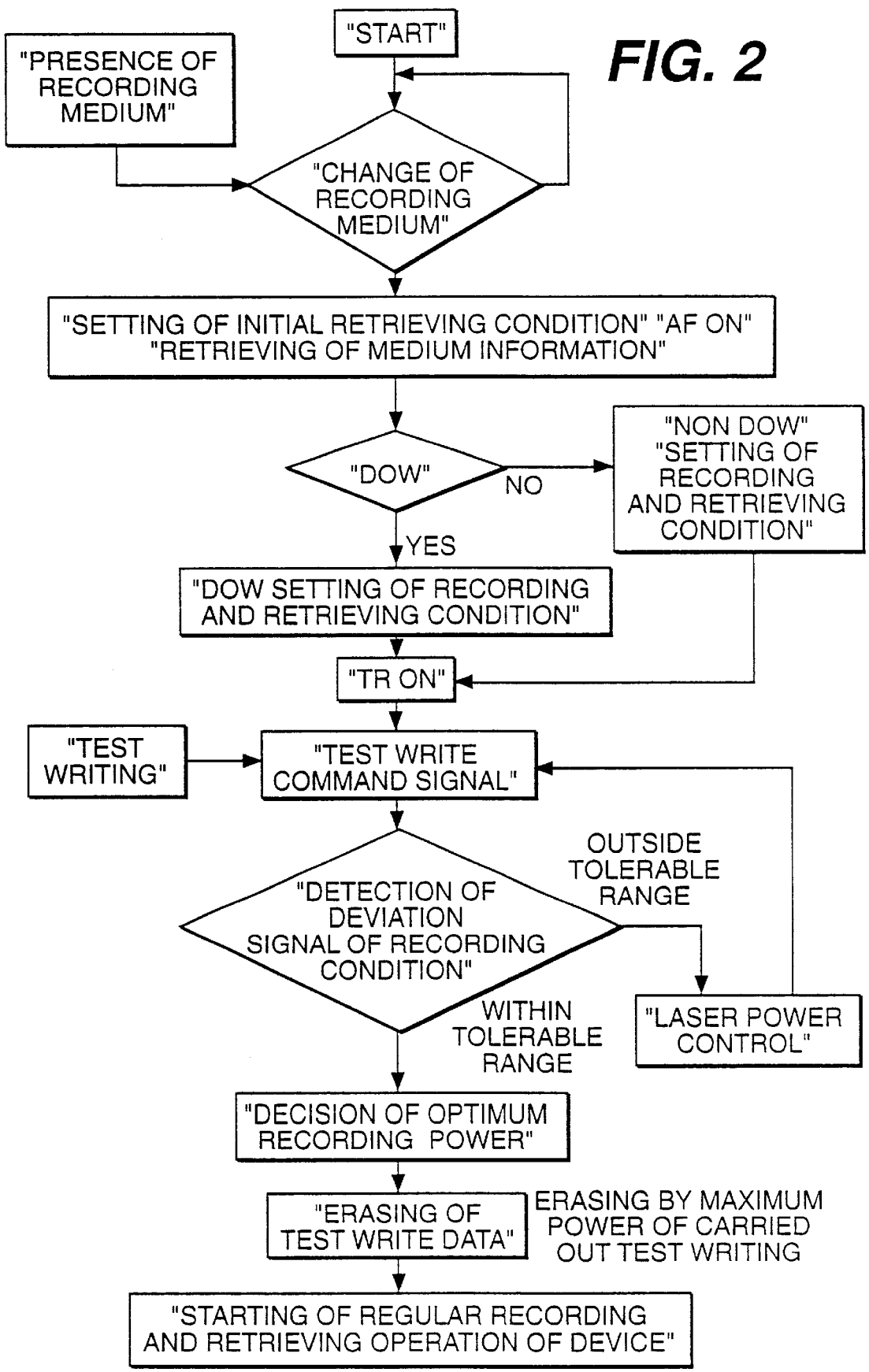
FIG. 2 is a flow chart of an example of a test write process.

An example of a flow chart of the operation of test write process according to the present invention is illustrated in FIG. 2. First, the device checks the installation of the recording medium and if the recording medium is not installed, the device remains in stand-by state. When the recording medium is installed, an initial retrieving condition is set up to the recording system (the high frequency current superposing circuit 13, the laser driver 14, the power monitor circuit 21 etc.), to the retrieving system and to the servo driving circuit 23. The recording medium is rotated and the light emission of the laser is turned on. The auto-focusing (AF) for controlling the optical spot on the recording medium with the run out of the recording surface (vertical direction in FIG. 1) is started next, and the kind of the recording medium installed to the device is judged. In this operational example, two kinds of medium that are a non-overwritable medium (NON DOW) and an overwritable medium (DOW) of the rewritable magneto-optical disks are described. According to the judgment of the kind of the medium, the recording and retrieving conditions are set up to the recording system and the retrieving system again and tracking (TR) to control the optical spot in the direction of the eccentricity of the recording medium and in the direction of radius of the recording medium is started.

The test write process is carried out next to confirm the conformity of the installed recording medium with the device. The test write process controls the recording power and the recording pulses etc. so that, the deviation of the record marks caused by the deviation of the recording sensitivity to the recording medium by the deviation of the film thickness of the recording medium and the deviation of the environmental temperature and the deviation of relative recording sensitivity by the change of the state of the device (the state of the laser light emission and the state of the position control of the optical spot) are reduced as much as possible. Also, detecting the recording condition deviation signal (deviation signal: difference between the central level of the densest pattern and the central level of the coarsest pattern) which is within the allowable range from the retrieved signal, the recording power, and when the recording condition deviation signal is almost zero, is judged as the optimum recording power.

In order to erase the recorded test write data, the maximum power used for the test write is used as the erasing power and the recorded test write data is erased all together. After finishing the above described test write process, the regular recording and retrieving operation of the device is started.

In the above described test write process, only the case of changing the recording medium is described but this is not necessary to obtain the optimum recording power. Even if the recording medium is not changed, stable regular recording and retrieving operation is possible as the optimum recording power can be set up continually regardless of the deviation of the recording sensitivity due to the temperature change inside the recording and retrieving device by periodical performing the test write by controller 19.

Figure 3:
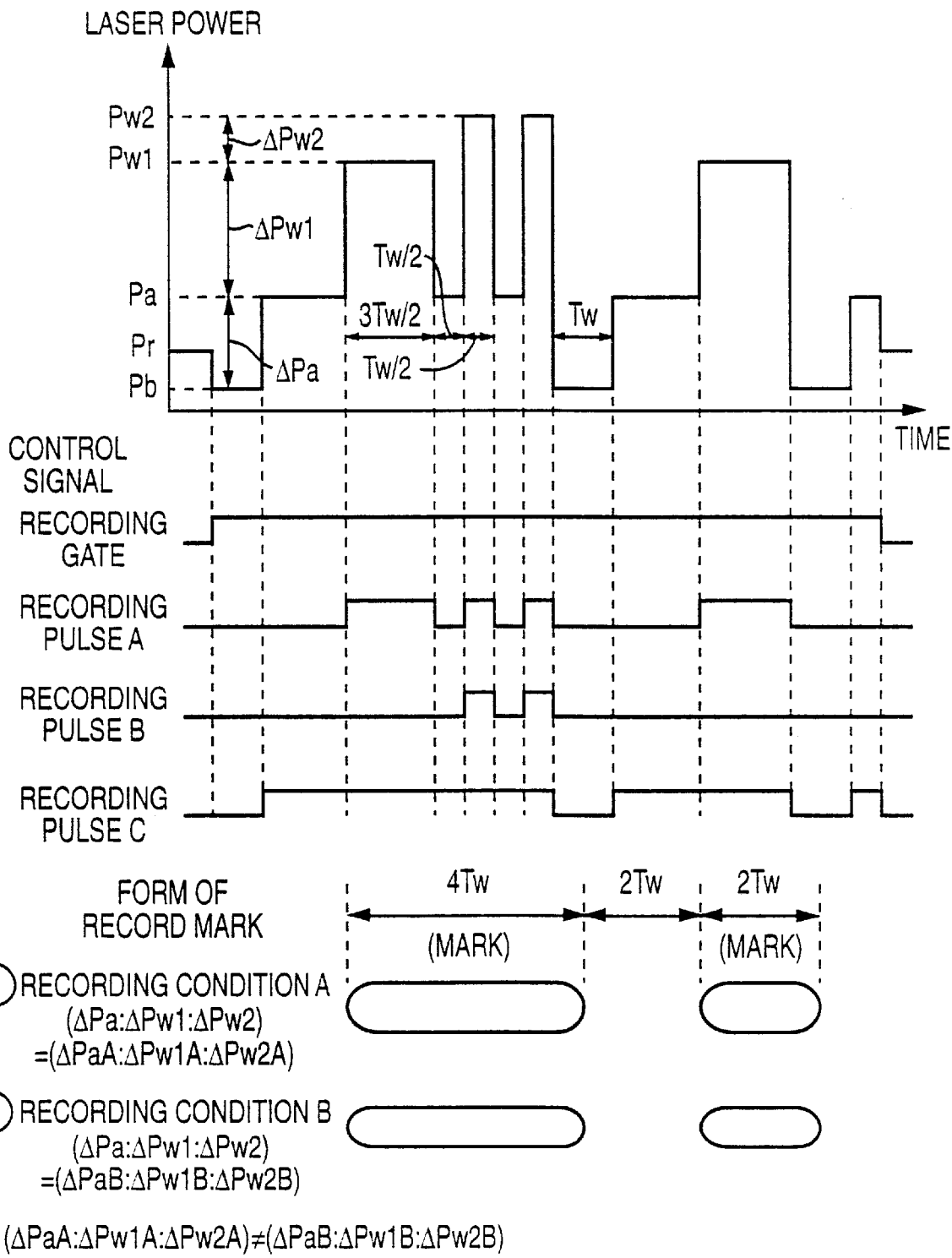
FIG. 3 illustrates a recording waveform, a control signal and the shape of recording mark that is formed.

FIG. 3 illustrates a recording waveform for recording, a control signal for the control of the recording waveform and a preferred embodiment of the record mark form that is formed by the recording condition and the recording waveform. The recording waveform is controlled by the laser power (strength of light on the surface of a film) on the recording medium and the duration. Each laser power value illustrated is described as follows.

Pr: Retrieving power

Pb: Bottom power (the lowest power level during the recording)

Pa: Assisting power (or erasing power)

$$Pa = Pb + \Delta Pa$$

(In non-overwrite, the power level of assisting the recording)

(In overwrite, the power level of the erasing)

Pw1: First recording power $$Pw1 = Pb + \Delta Pa + \Delta Pw1$$

Pw2: Second recording power $$Pw2 = Pb + \Delta Pa + \Delta Pw1 + \Delta Pw2$$

The duration of each power (pulse width) is controlled by the following control signal.

Recording gate: Duration in which the recording is carried out. (A signal that validates or invalidates each recording pulse (power))

Recording pulse A: The control signal that validates/invalidates $\Delta Pw1$

Recording pulse B: The control signal that validates/invalidates $\Delta Pw2$

Recording pulse C: The control signal that validates/invalidates $\Delta Pa$

By the combination of these recording pulses, the recording mark is formed, as illustrated in FIG. 3. The form of the recording mark under two kinds of recording conditions is illustrated. In the above described non-overwrite medium and overwrite medium, the value of each laser power ($\Delta Pa$, $\Delta Pw1$ and $\Delta Pw2$) is different and the recording mark form is different as illustrated. Particularly in the overwrite medium, the strict restriction of the setting condition of the erasing power Pa (or $\Delta Pa$) is required. Before controlling the mark form, the setting of the power that can carry out the erasing securely is required.

On the other hand, in the non-overwrite medium, it is required that the mark is not recorded by the Pa level but the range of setting the power is wider compared with the case of the overwrite medium. Therefore, in the magneto-optical disk with the same magnetic film, a different recording condition is required for a recording medium having a different recording sensitivity (characteristic) at a similar recording density and a similar linear velocity. As is estimated easily from the recording mark form, the characteristic of the retrieved signal is varied depending upon the width of the recording mark and the retrieving condition is required to be set up in each case.

Figure 4A:
FIGS. 4A–4D illustrate an example of the detection of optimum recording power in a test write process.
Figure 4B:
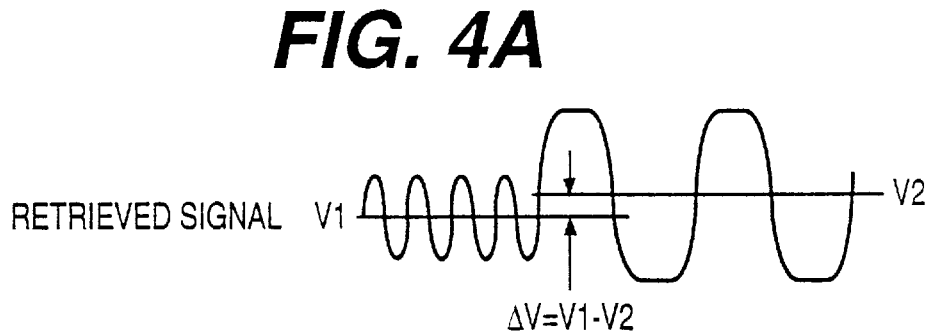

FIGS. 4A–4D illustrate a preferred embodiment of the detection of the test write data and the determination of the optimum recording power. The test write data used are repeated patterns of the most dense pattern (in the case of (1,7) RLL code, (2Tw)) that is the highest frequency of this device and the least dense pattern (8Tw) that is the lowest frequency. FIG. 4A illustrates the recording mark recorded by the test write process. FIG. 4B illustrates the retrieved signal obtained from the recording mark of FIG. 4A. In mark edge recording, the time base control of the record mark is important and when the central levels of the retrieved signals of the most dense pattern and the least dense pattern are equal, it can be concluded that the time bases of each pattern are controlled and the recording power at that time is the optimum recording power. In this preferred embodiment, the time base deviation is detected by the deviation of the amplitude level.

Figure 4C:

The test write data detecting circuit 12 of FIG. 1 detects the central level (V1) of the most dense pattern and the central level (V2) of the least dense pattern from the retrieved signal, and then the differential voltage $\Delta V = V1 - V2$ is calculated. The timing of detecting the central level (V1) of the most dense pattern is decided by the timing of sample pulse 1 and the timing of detecting the central level (V2) of the least dense pattern is decided by the timing of sample pulse 2 as illustrated in FIG. 4C.

$\Delta V$ is input to the controller 19 as the deviation signal of the recording condition. An example of detecting the deviation signal of the recording condition is illustrated by the FIG. 4D. The optimum recording power is decided by comparing $\Delta V$ that is the input deviation signal ($\Delta V$) inside the controller 19. In this preferred embodiment, the recording power P9, of which deviation signal ($\Delta V$) is almost zero, is selected as the optimum recording power, the corresponding conditions are set up to the recording system and regular information recording is carried out. The recording power at the test write is as follows.

$$Pn = Pb + Kn\Delta Pa + Kn\Delta Pw1 + Kn\Delta Pw2$$

n=1~13 (reference): the range of power scan

Kn: magnification constant at the variable power

Figure 4D:
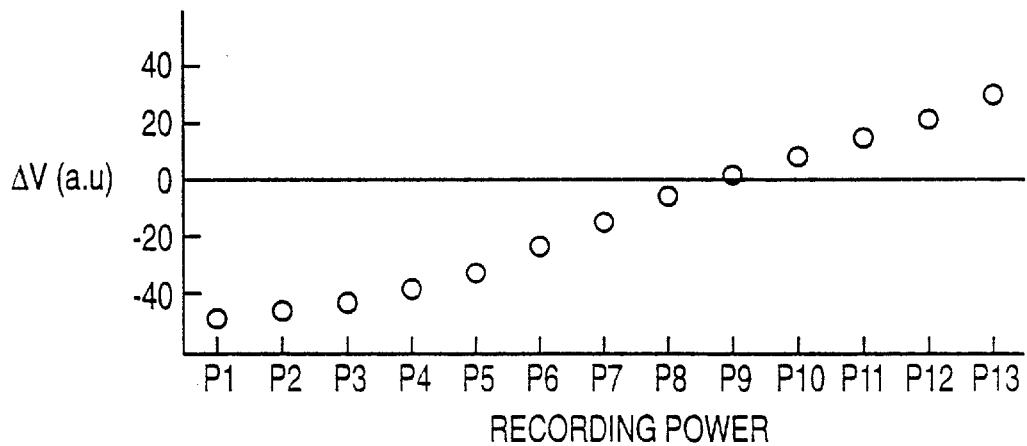

The power for carrying out regular information recording can be decided arbitrarily because not only is the optimum recording power detected but the recording state of lesser power and greater power are also detected. This is illustrated by FIG. 4D.

Figure 5:
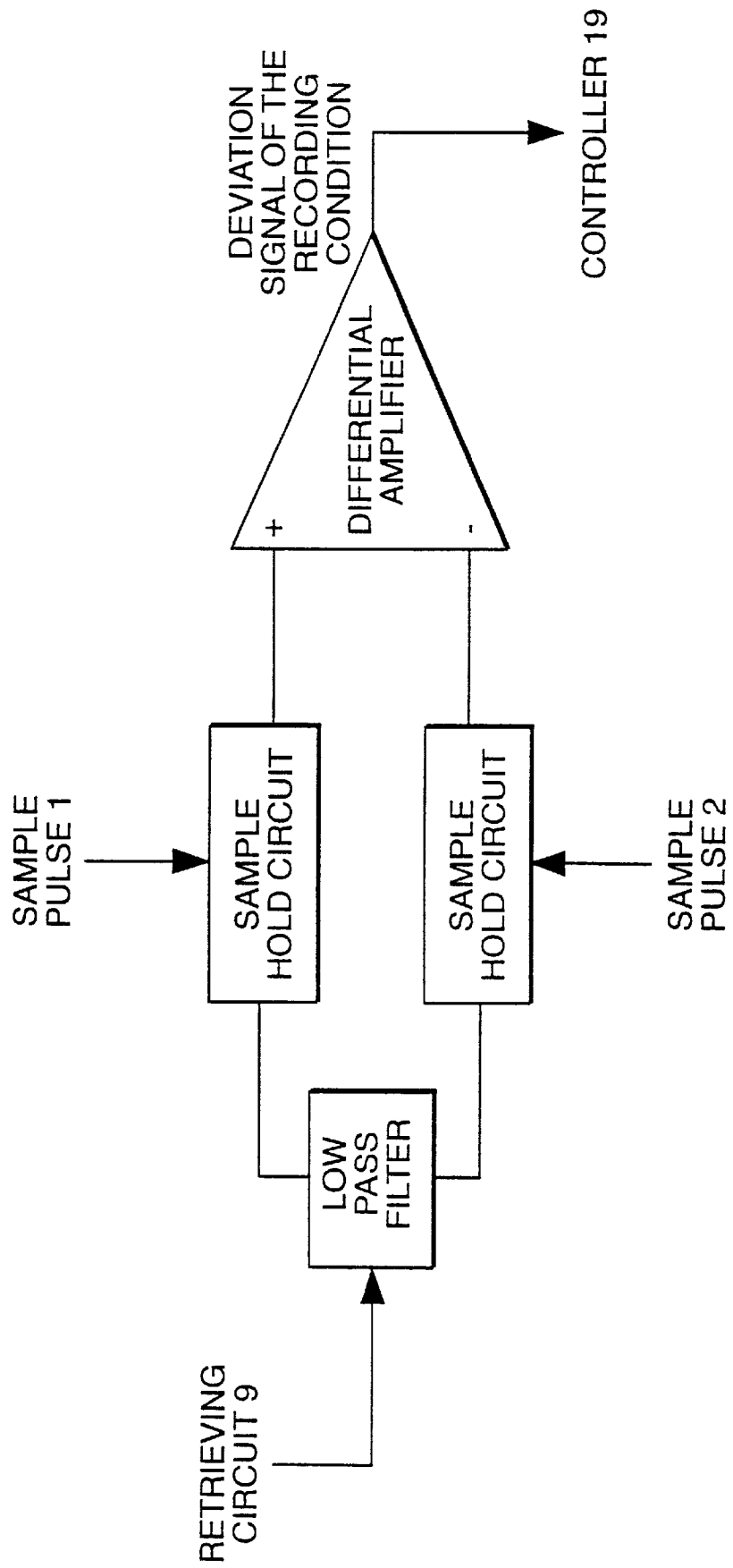
FIG. 5 is a block diagram of an embodiment of a central level detecting circuit for test write data.

FIG. 5 illustrates a preferred embodiment of detecting the central level of the test write data that is used by the test write data detecting circuit 12. A low pass filter is provided for the retrieved signal from the retrieving circuit 9, and the average level of the retrieved signal is detected. Then, V1 and V2 are detected as the average levels for each data by the two sample hold circuits, and ΔV (the deviation signal of the recording condition) is input to the controller 19 from a differential amplifier.

Figure 6:
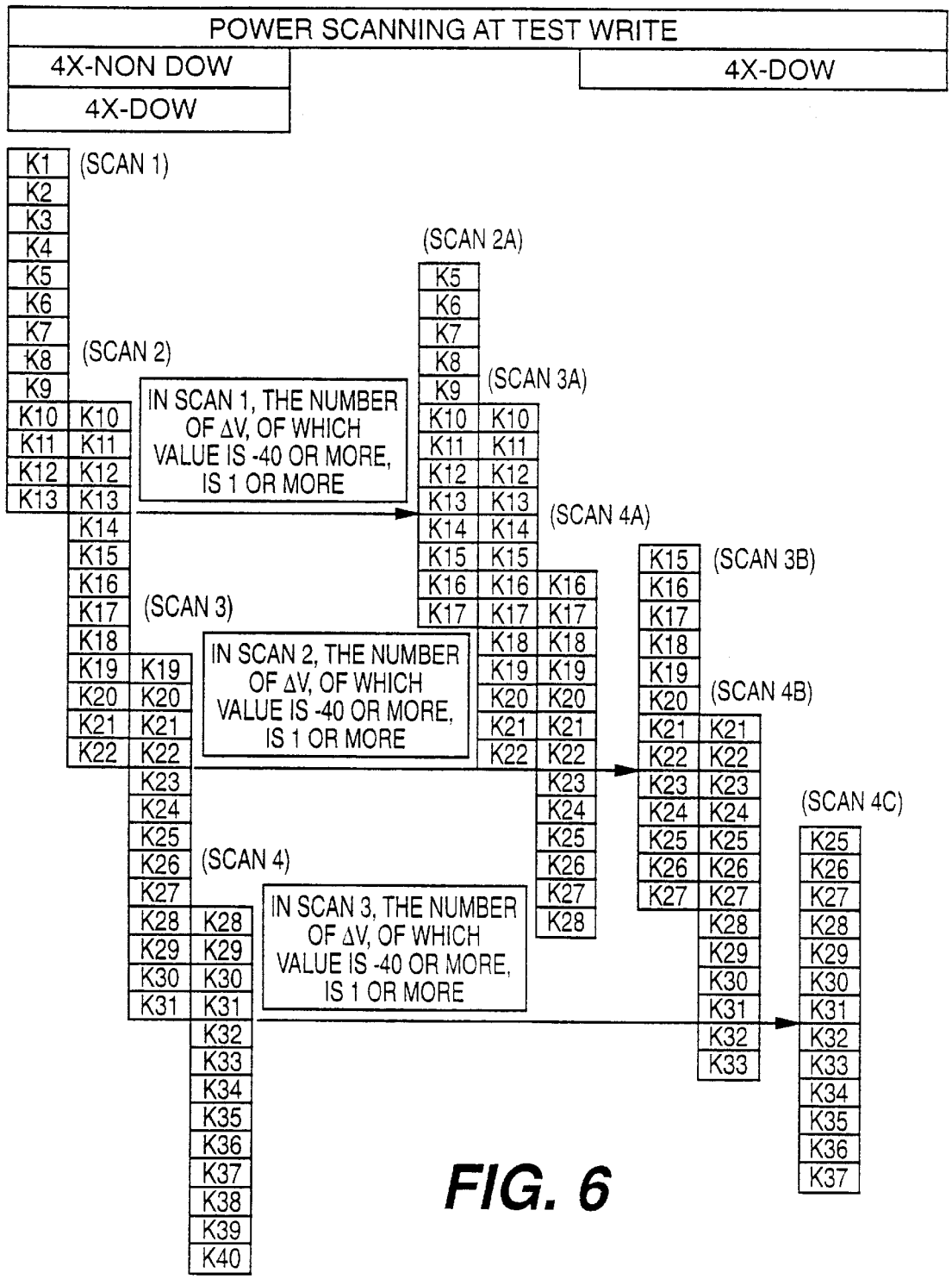
FIG. 6 is a method of power scanning in a test write process.

FIG. 6 illustrates a method of performing power scanning at the test write process according to the present invention. The range of the power scanning should be decided considering the wide deviation of the recording power due to the deviation of the recording sensitivity caused by the deviation of the thickness of the film etc., the deviation of the environmental temperature, the decrease of the quantity of light by dust, the deviation of the device (such as difference of the shape of the optical spot etc.), the decrease of the quantity of light by the aging of the laser and the deviation of the recording sensitivity by the deterioration of the characteristic of the recording medium, etc..

Here, the range of the power scanning is indicated by the magnification constant Kn at a variable power and having a range defined as K1 to K40. The processing of the detection of the optimum power by the test write process in a short time is achieved by processing the entire range of power in a single scan. However, the optimum power cannot always be precisely set in this manner because the scanning range of the recording power is wide and the changing step of the recording power for each recording (the quantity of the deviation) becomes larger. Also, there is a concern that with excessive power recording (the recording state beyond the optimum recording power), deterioration of the recording medium may occur as well as shortening of the life span of the light source. Therefore, as illustrated at the left side of FIG. 6, an example of power scanning is performed as follows: the power scanning range is scanned by four scans; the number of overlaps is equal to four from scan 2 to scan 4; and scanning is started from the lower portion of the power magnification constant (k1).

In this preferred embodiment, the standard power scanning is from power magnification constant (k1) to (k13). Depending on the recording medium, for example, the standard power scanning can be changed to the range of magnification constant (k1) to (k22). According to this embodiment, compared with the method of processing the above described power scanning range in a single scan, the preciseness of setting the recording power is improved and excessive power recording is suppressed to an extent. In the preferred embodiment, power magnification constant of the optimum recording power is supposed to be (k14), although the optimum recording power is determined after scan 2, only 8 steps of excessive power recording (k15 to k22) are generated.

As is illustrated at the right side of FIG. 6, the deviation signal of the recording condition (ΔV) obtained by scan 1 is judge processed by the controller 19 and when the optimum power cannot be detected and when one or more of the ΔV having a value of ΔV≧−40 is/are detected, the number of overlaps in scan 2, with respect to scan 1, is changed to 9. This way, when scan 2A is performed, excessive power recording is reduced to only three steps of power magnification (k15 to k17). (Experimentally there is the difference of durability of 1.2 times between the deterioration of the characteristic of the non-overwrite and overwrite medium by the excessive power recording and it is understood that the overwrite medium cannot withstand the excessive power recording.)

As described above, by performing judge processing or learn processing the deviation signal of the recording condition (ΔV) by the controller 19, scan 3, for example, can be carried out according to the value of the deviation signal of the recording condition after the execution of the scan 1 according to another embodiment of the present invention. By memorizing the relation between the deviation signal ΔV and the recording mark form by the controller 19, the scanning can be started from any power magnification constant Kn, and by changing the power magnification constant Kn, the preciseness of setting the recording power can be improved.

It should be understood that while the disclosure above is provided by way of example of a preferred embodiment, various modifications can be made without departing from the scope of the present invention. For example, while the case where one or more values of ΔV≧−40 is/are detected as a group. This analysis could be more refined so as to vary subsequent scans depending upon exactly how many of the values of ΔV≧−40, if this can be determined. Also, the value −40 can be changed to a different value (−20 for example) for a subsequent scan, once a value of −40 has been detected. This type of method may be more time consuming, but would further prevent excessive recording power. Therefore, the particular needs of any application will need to be considered and the trade offs recognized.

Figure 7:
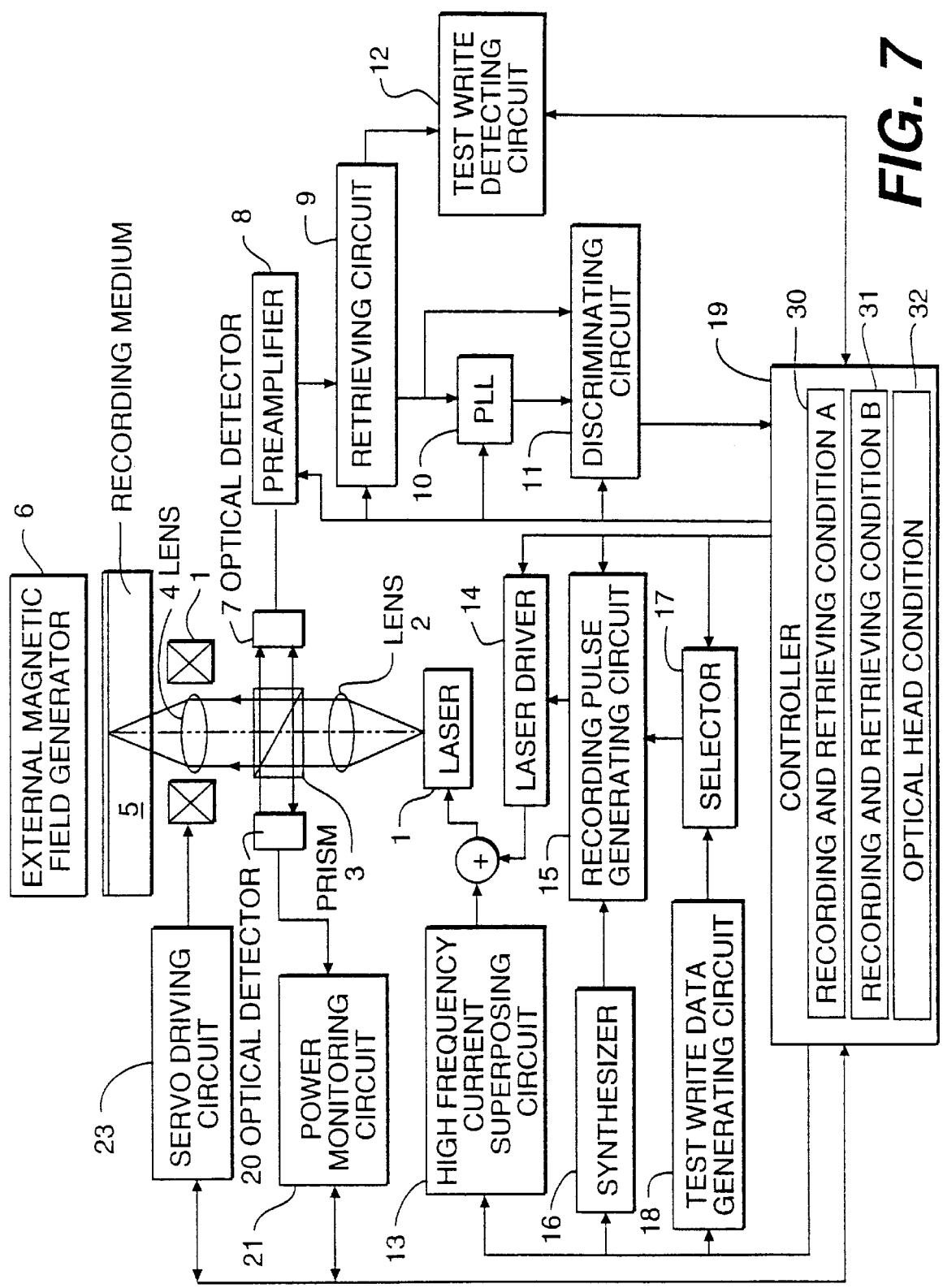
FIG. 7 is a block diagram that illustrates a second embodiment of the present invention.

FIG. 7 illustrates a second embodiment of the device constructed according to the present invention. The configuration of FIG. 7 is similar to that of the FIG. 1, but an optical head condition 32 that correspond to the state of the initial adjustment of the optical head, of which major component is the laser 1, is memorized inside the controller 19. Before a test write process is executed, the optical head condition 32 is fed back to the recording system or the retrieving system according to the characteristic of the recording medium (recording sensitivity, etc.) and the operational processing to the optical head condition 32 is executed inside the controller 19. Therefore reliable recording and retrieval of information is performed.

Figure 8:
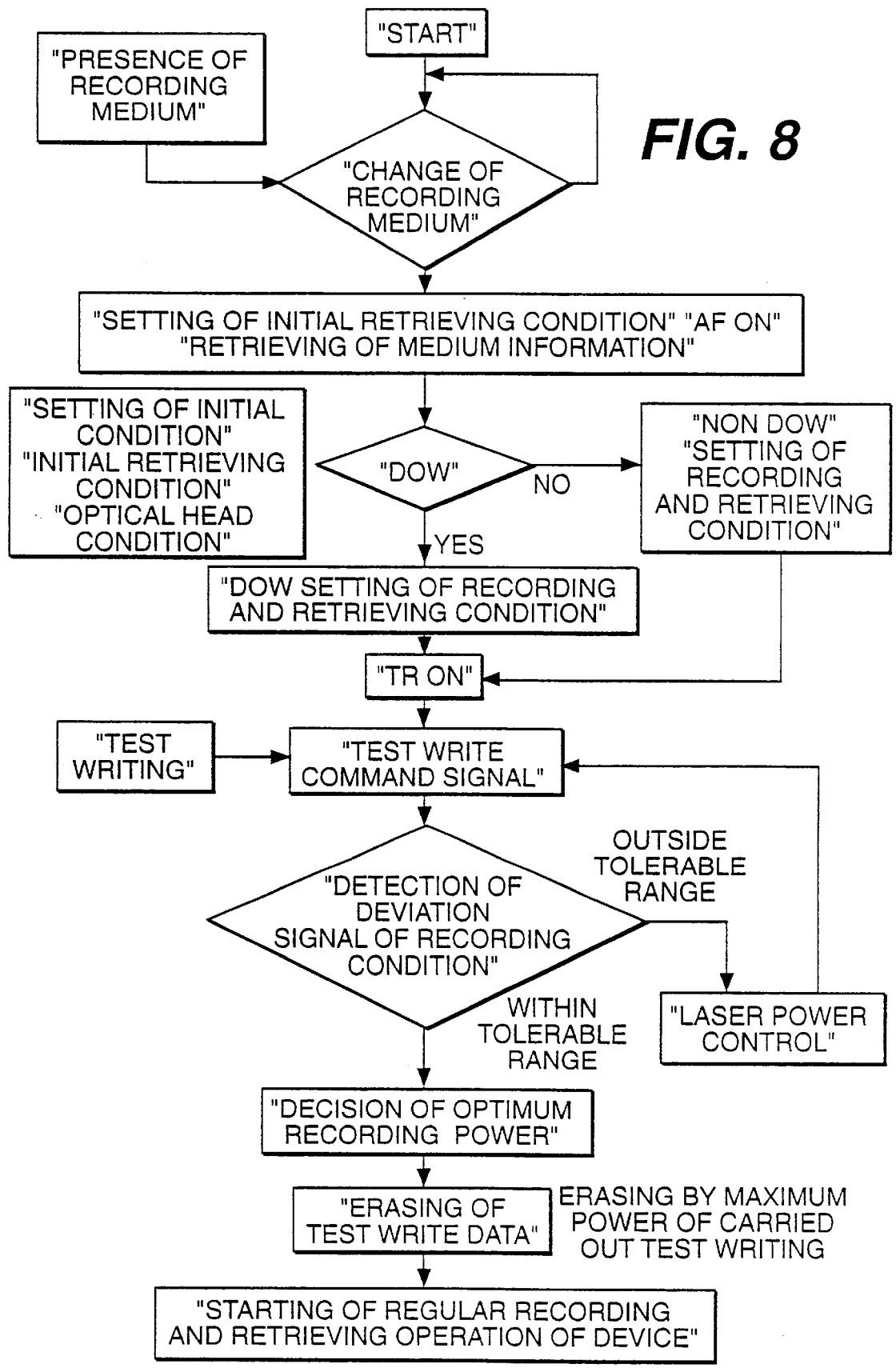
FIG. 8 is a flow chart of a test write process according to the second embodiment.

FIG. 8 illustrates an example of a flow chart of the procedure of the test write process for the device constructed according to the embodiment of FIG. 7. The procedure of the test write process is similar to that of illustrated by the FIG. 2 but the way of feeding back the optical head condition 32 to the recording system and the retrieving system is changed according to the recording medium that is installed to the device. The rest of the procedure is similar to that discussed above in conjunction with FIG. 2.

Figure 9A:
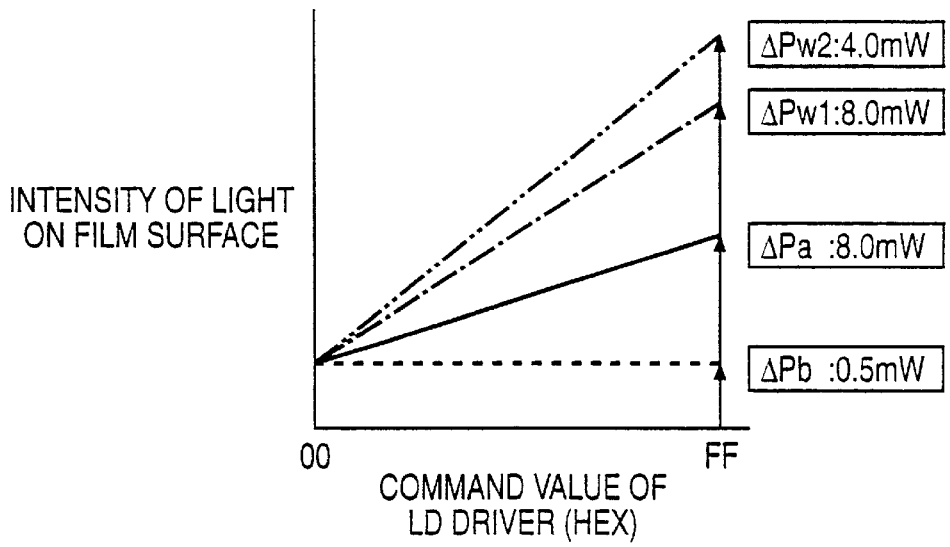
FIGS. 9A and 9B are examples illustrating the operation of feeding back the optical head condition to a device according to the second embodiment.
Figure 9B:
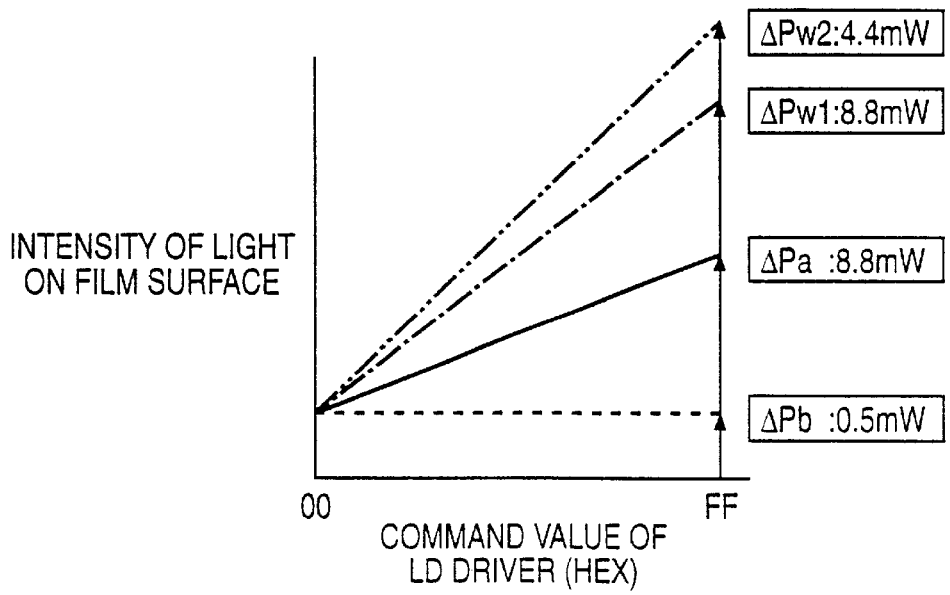

FIGS. 9A and 9B illustrate examples of the operation of feeding back the optical head condition to the device. FIG. 9A illustrates the value of each power (state of initial adjustment) with the optical head conditions, where the abscissa indicates the instruction value of the laser driver with a hexadecimal notation, and the ordinate indicates the intensity of light on the film surface (laser power). The intensity of the light on the film surface at the maximum instruction value of the laser driver is, Pb: 0.5 mW Pa: 8.0 mW Pw1: 8.0 mW Pw2: 4.0 mW When the recording sensitivity of the recording medium is decreased by 10%, each power value is changed based upon the optical head condition illustrated in FIG. 9B. The intensity of the light on the film surface at the maximum instruction value of the laser driver in this case is, Pb: 0.5 mW Pa: 8.8 mW Pw1: 8.8 mW Pw2: 4.4 mW The bottom power Pb is the lowest power during the recording and it is a fixed value.

Thus, as described above, stable processing is realized without being effected by the recording medium and processing time is reduced as the complex learning process is simplified. The test write process can be carried out without changing the minimum value and the maximum value of the range of the power scanning that is illustrated by FIG. 6, by correcting each power value corresponding to the deviation of the recording sensitivity of the recording medium by correcting each power value based upon the optical head condition. The test write process is stably operated by using this processing, in the case the quantity of light to the instruction value of the laser driver is decreased by the aging of the laser.

With the present invention, the reliability of the recording and retrieving device, the recording capacity and the transfer rate of information are improved by suppressing the deviation of the recording sensitivity to the recording medium and the deviation of recording sensitivity by the recording and retrieving device that are caused by the deviation of the film thickness of the recording medium and the deviation of the environmental temperature. Thus, the conformity of the recording and retrieving device with the recording medium is improved and the recording mark is controlled with great precision. Furthermore, a change in the characteristic of the recording medium caused by excessive power is suppressed. Also, by extending the life of the light source, the reliability of the recording and retrieving device is improved.

While the present invention has been described in conjunction with the preferred embodiments disclosed, one of ordinary skill in the art would be enabled by this disclosure to make various modification to those embodiments and still be within the scope and spirit of the present invention as recited in the appended claims.

What is claimed is:

1. A method of determining a laser power for recording data by a laser onto a recording medium to test write process, characterized in comprising the steps of:

first recording step for recording data onto a predetermined part of the recording medium while varying the laser power according to a first range;

first retrieving step for retrieving data from the recording medium;

second recording step for recording data onto a predetermined part of the recording medium while varying the laser power according to a second range which overlaps the first range with a first number of overlaps;

second retrieving step for retrieving data from the recording medium; and third recording step for recording data onto a predetermined part of the recording medium while varying the laser power according to a third range which overlaps the first range with a second number of overlaps, the second number of overlaps is greater than the first number of overlaps.

2. The method according to claim 1, wherein said ranges consist of magnification constants at the variable power.

3. The method according to claim 1, wherein said ranges correspond to a change in output coefficient of a laser driver which drives the laser.

4. The method according to claim 1, wherein said ranges give different recording mark forms on the recording medium.

* * * * *